United States Patent [19]

Llabres et al.

[11] 4,238,179

[45] Dec. 9, 1980

[54] ARRANGEMENT FOR PRESSING FLEXIBLE DISCS AND A PRESSING PROCESS USING THIS ARRANGEMENT

[75] Inventors: Raymond Llabres; Liliane Fournier; Claire Lemonon, all of Paris, France

[73] Assignee: Thomson-CSF, Paris, France

[21] Appl. No.: 51,410

[22] Filed: Jun. 25, 1979

[30] Foreign Application Priority Data

Jun. 29, 1978 [FR] France .................................. 78 19502

[51] Int. Cl.³ ........................ B29D 17/00; B29C 3/00
[52] U.S. Cl. .................................... 425/394; 425/810; 425/406
[58] Field of Search ................. 264/107; 425/810, 394, 425/406

[56] References Cited

U.S. PATENT DOCUMENTS

| | | | |
|---|---|---|---|
| 1,576,642 | 3/1926 | Bishop | 425/810 |
| 3,819,315 | 6/1974 | Borchard et al. | 425/810 |
| 3,932,097 | 1/1976 | Press | 425/810 |
| 3,941,547 | 3/1976 | Hunyar et al. | 425/810 |
| 3,945,790 | 3/1976 | Puech | 425/810 |
| 4,018,552 | 4/1977 | Prost et al. | 425/810 |

*Primary Examiner*—J. Howard Flint, Jr.
*Attorney, Agent, or Firm*—Cushman, Darby & Cushman

[57] ABSTRACT

The invention relates to an arrangement for pressing flexible discs by compression under heat, comprising heating plates, each carrying a plate of flexible closed-cell foam similar in diameter to the engraved matrices. The flexible disc to be pressed is placed between an engraved matrix and a counter plate or a second engraved matrix, the assembly being placed between the plates of closed-cell foam in such a way that, during compression, these cellular foam plates act as a pneumatic compensator and enable the pressure to be uniformly distributed over the surface to be engraved.

6 Claims, 4 Drawing Figures

ARRANGEMENT FOR PRESSING FLEXIBLE DISCS AND A PRESSING PROCESS USING THIS ARRANGEMENT

BACKGROUND OF THE INVENTION

1. FIELD OF THE INVENTION

This invention relates to the pressing of flexible discs and, more particularly, to the pressing of optically readable video discs.

2. DESCRIPTION OF THE PRIOR ART

It is known that "flexible" audio discs can be pressed by means of compression presses comprising heating plates of which one carried the engraved matrix. The discs are obtained by thermoforming a thermoplastic material according to a predetermined pressure-temperature cycle. During this cycle, the heating plates are subjected to stresses which give rise to deformations remaining in the disc thus obtained after cooling. The contact systems used for reading audio discs are such that the contact pressure applied to the diamond causes it to follow the surface irregularities of the disc. Accordingly, the tolerances concerning the surfaces of discs such as these are fairly wide.

By contrast, the dimensions of the elements recorded on the surface of an optically readable video disc and the reading systems used for optically reading the recorded elements of such discs impose much more stringent requirements on the production of the discs, particularly in regard to their surface state, and call for a certain number of precautions to be taken during pressing. It is known for example to use a compression press in which the material to be pressed is held between a matrix, on which a negative of the information to be recorded on the flexible disc has been formed, and a counter cushion comprising at least one surface layer and an elastic pad capable of sliding on this surface layer so as to maintain a substantially uniform pressure over the entire surface to be pressed. In improved versions of this arrangement, the counter cushion is made up of an elastic pad and several layers adhering to one another by friction. Arrangements such as these enable thermoplastic sheets to be pressed by neutralising the unevenly distributed tensions which would give rise to deformation of the pressed sheets in their finished state. Arrangements such as these are difficult to produce and use on account of the multi-layer structure of the counter cushion. In addition, they are asymmetrical because the matrix rests on a rigid support.

SUMMARY OF THE INVENTION

The present invention relates to an arrangement for pressing flexible discs, particularly video discs, which is both simpler and more effective than existing arrangements. In particular, the arrangement for pressing flexible discs according to the invention comprises a plate compressible without multiaxial flow between each of the heating plates and the engraved matrix on the one hand and a counter plate or a second engraved matrix on the other hand.

In one preferred embodiment of the invention, the compressible plates are made of a flexible closed-cell foam. These compressible plates act as a pneumatic compensator and also reduce the deformation which would otherwise arise out of faults in the surface state of the rear faces of the matrices and counter plates.

BRIEF DESCRIPTION OF THE DRAWINGS

The invention will be better understood and other features thereof will become apparent from the following description in conjunction with the accompanying drawings, wherein.

In all these diagrammatic drawings, the proportions have not been respected in order to show details which had the proportions been respected, would not be visible. The flexible, optically readable (by transmission or reflection) video discs generally comprise an approximately 150 $\mu m$ thick sheet on which the information is recorded on a spiral groove having a pitch of 1.6 $\mu m$ in the form of a relief modulation. This relief modulation assumes the form of microgrooves 0.15 $\mu m$ deep, the length of these microgrooves and the spacing between them being variable around 1 micrometer. During the optical reading of discs such as these, a laser beam is focussed on the information recorded on the disc which is rotated relative to the reading head and to a fixed plate. The precise focussing of the beam on the track is obtained by a servomechanism of which the transfer function is known. For the beam to be correctly focussed on the disc, the deviations must not be greater than those capable of being corrected by the servomechanism which are dependent on the frequency. Accordingly, it is absolutely necessary to produce discs having thickness and flatness faults which are small enough to be able to be corrected and not to cause any malfunction of the reading system. The press according to the invention is designed for pressing flexible discs in accordance with the dimensional restraints imposed by optical reading in view of the dimensions of the recorded elements.

Figure 1:
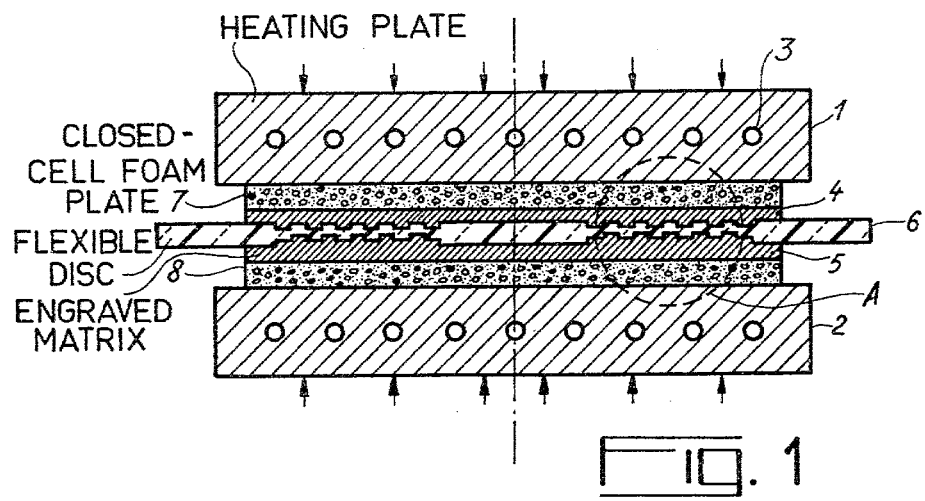
FIG. 1 is a diagrammatic section through one embodiment of the arrangement according to the invention for pressing flexible discs.

A first embodiment of this press is shown diagrammatically in section in FIG. 1. It comprises two heating plates 1 and 2 in which a hot convector fluid, for example saturated steam, may circulate. The geometry of the circulation passages, such as 3, is such that the plates are heated to a uniform temperature. In order to obtain a uniform pressure between the engraved matrices 4 and 5 and the thermoplastic disc 6 to be pressed, on both sides of which tracks are recorded, plates 7 and 8 made of a compressible deformation-reducing material are placed between the heating plates 1 and 2 and the engraved matrices 4 and 5, respectively. To ensure that the compressible material does not undergo any multiaxial flow, i.e. in the plane perpendicular to the pressures applied during compression, the material used for the compressible plates is a flexible closed-cell foam, for example a polyester foam, a polyurethane foam or a silicone foam. The thickness of the plate and its density are optimised in such a way that its thermal resistance is low and its compressibility at the pressing temperature is suitable. Its thickness may be typically of the order of 5 to 10 mm. Since the temperature to which the flexible disc has to be heated for thermoforming is determined in advance, the plates of closed-cell foam have to withstand higher temperatures to ensure that the cellular structure does not burst because, due to the thermal resistance of these plates, the heating plates have to be heated to temperatures above the necessary pressing temperature. In an arrangement such as this, the pressure stored in the cells of the plates of closed-cell foam is uniformly restored over the surface of the disc to be pressed. In addition, a structure such as this, in which the assembly formed by the first matrix, the flexible thermoformable disc and the second matrix is sandwiched between two plates of closed-cell foam, also makes it possible to overcome the local variations in thickness, in the form of increases in thickness, which are present on the rear faces of the matrices.

Figure 2:
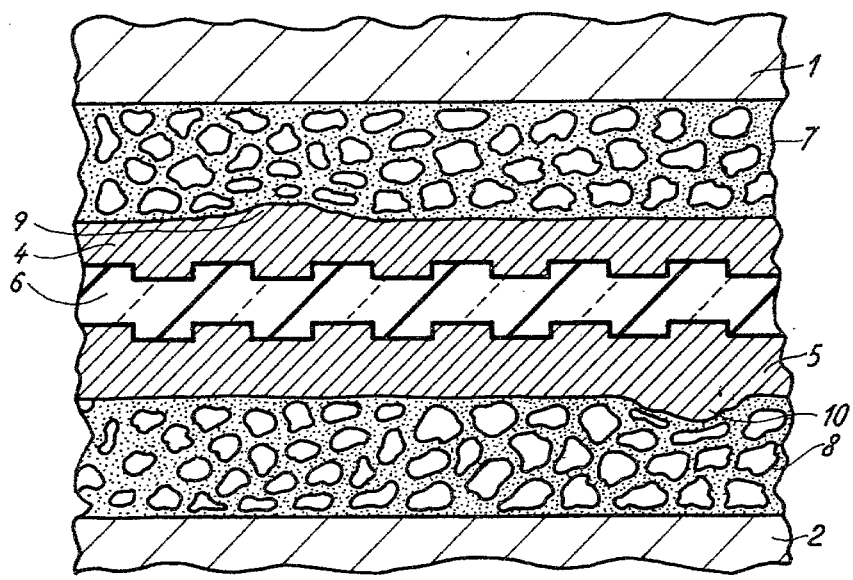
FIG. 2 illustrates part of the arrangement on a larger scale showing how the variations in the surface state of the matrix and counter plate are absorbed.

FIG. 2, which shows an enlarged detail A of FIG. 1, illustrates faults such as these which are denoted by the reference 9 on the rear face of the matrix 4 and by the reference 10 on the rear face of the matrix 5. By absorbing these faults, which are generally caused by inhomogeneities in the baths used for producing the matrices by electroplating, the structure described above makes it possible to eliminate one phase of the production process which comprises polishing the matrices to obtain sufficiently smooth rear faces. As shown in FIG. 2, the cellular structure of the foam enables these local faults to be absorbed.

FIG. 1 shows foam plates 7 and 8 equal in diameter to the matrices. This diameter is the maximum diameter which the foam plates may have if the outer rims of these plates in relation to the matrices are to be prevented from coming into contact with and adhering to the flexible disc during pressing. Effects such as these would give rise to difficulties during removal from the mould.

On the other hand, the diameter of these foam plates must remain larger than the external diameter of the etching to ensure that the effect by which the pressure is uniformly distributed in the zone of the disc intended to carry the information is satisfactorily obtained.

Figure 3:
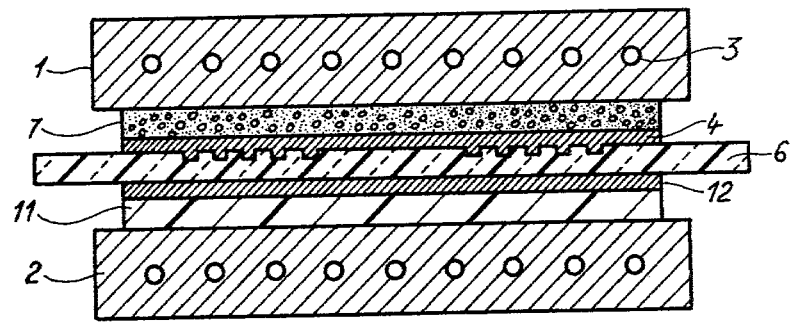
FIGS. 3 and 4 are diagrammatic sections through second and third embodiments of the press according to the invention.

FIG. 3 diagrammatically illustrates a second embodiment of the press according to the invention. The references used are the same as those used in FIG. 1 for the same elements. The only difference between these two embodiments is that the pneumatic compensator is formed by a compressible layer 7 of flexible closed-cell foam similar to that described above and by a compressible layer 11 of an elastic material which replaces the layer 8. The material may be an elastomer or a plate of Teflon. The elastic plate made of a closed-cell foam is capable of uniformly restoring the stored pressure energy whilst the second plate does not necessarily have to consist of a closed-cell foam if the flexible disc is only to be recorded on one side, as shown in FIG. 3. The counter matrix 12 may be a plate of suitable flatness because the local faults only have to be compensated on the rear face of the matrix 4. The arrangement illustrated in FIG. 3 also comprises two heating plates 1 and 2.

Figure 4:
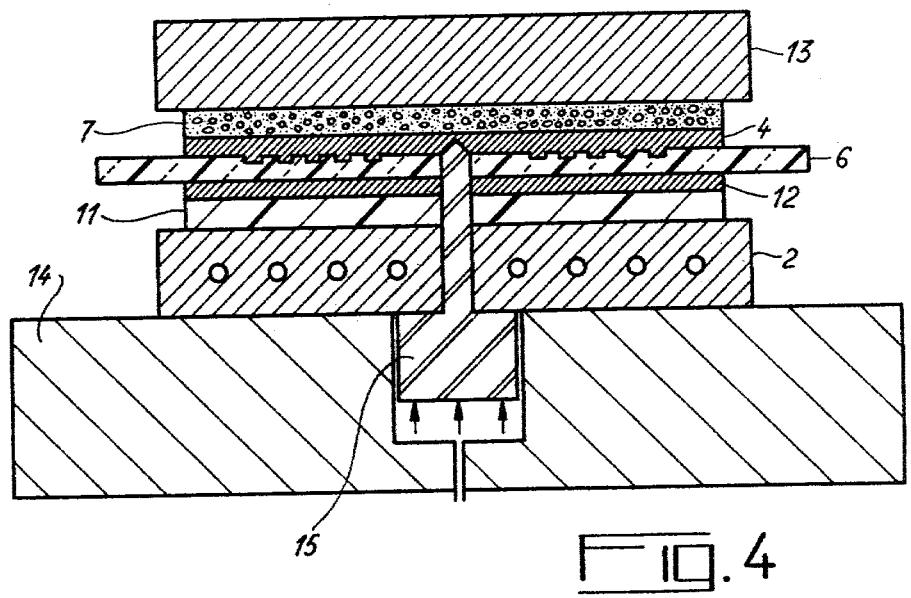

The arrangement illustrated in FIG. 4 is similar to that illustrated in FIG. 3, but comprises only one heating plate, namely the plate 2, the other plate 13 being a non-heating plate which is solely intended to apply the pressure forces to the disc in co-operation with the heating plate 2.

This structure may be practical in cases where the heating plate is brought into contact with an elastic plate 11 of compact non-cellular structure made of a material characterised by high thermal conductivity. In that case, the elastic plate 7 does not have to withstand high temperatures.

The arrangement shown in FIG. 4 additionally comprises a tool for forming a central hole in the flexible disc. This tool is diagrammatically shown in the form of a punch 15 which is operated by pressure. The assembly formed by the plates 2 and 13, the compressible elastic sandwich consisting of the plates 7 and 11, the counter matrix 12, the flexible disc 6 and the matrix 4 is supported by a support 14. In the rest position, the highest side of the punch is level with the counter-matrix which itself is perforated beforehand. The flexible disc is then placed on the counter matrix. The assembly formed by the plate 13, the cellular foam plate 7 and the counter matrix is then brought into contact with the flexible disc 6. The pressure-temperature cycle required for the pressing operation is then applied to the assembly and the formation of the central hole by the punch 15 is carried out.

The invention is by no means limited to the embodiments described above. In particular, it is possible to use only one heating plate and a compressible sandwich formed by two cellular foam plates for pressing the disc between two matrices intended to reproduce the information which they carry on the two sides of the flexible disc. In addition, no provision was made in the foregoing description for fixing the upper matrix and the upper elastic plate to the upper plate. Although this fixing is not essential, it may readily be carried out, particularly with a view to mechanising the disc-pressing operation, a roll of plastic film being unwound in steps between the matrices or between the counter matrix and the matrix which, in this case, are spaced apart from one another.

What we claim is:

1. An arrangement for copying by heat pressing onto a flexible thermoformable sheet an engraved relief comprising:
    first and second matrices for receiving said sheet therebetween, of which at least one matrix carries said engraved relief facing one side of said sheet;
    two parallel plates of which at least one is a heating plate; and
    pneumatic compensator means between said plates including first and second pads for receiving between them said matrices and sheet, at least one of said pads being made of foam having gas filled, closed cells for pneumatically transmitting the pressure supplied by said parallel plates to said matrices.

2. An arrangement as in claim 1, wherein the other of said pads is made of said foam.

3. An arrangement as in claim 1, wherein said pads and matrices are cylindrical and the diameter of each pad is no greater than the diameter of said matrices and no less than the diameter of said engraved relief.

4. An arrangement as in claim 1, wherein the other of said plates is a heating plate and the other of said matrices carries an engraved relief facing the other side of said sheet.

5. An arrangement as in claim 1, further including means for forming a central hole in said sheet.

6. An arrangement as in claim 1, wherein said foam is chosen from the group consisting of polyester foam, polyurethane foam and silicone foam.

* * * * *